Jan. 6, 1942.  C. W. THORNTHWAITE  2,268,785
DEW POINT RECORDER AND INDICATOR
Filed June 13, 1941
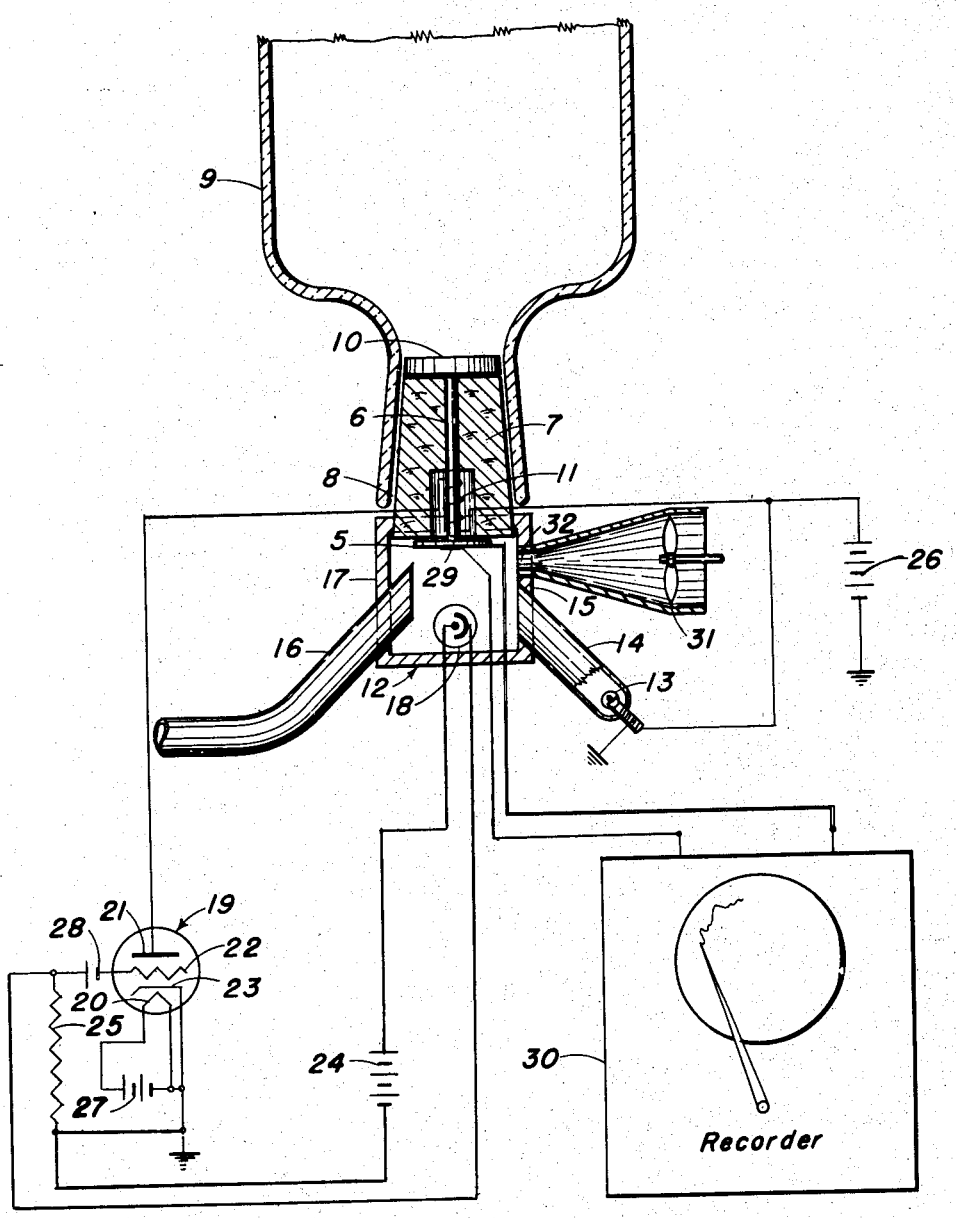
Inventor
Charles Warren Thornthwaite
By
Attorneys Patented Jan. 6, 1942

2,268,785

UNITED STATES PATENT OFFICE 2,268,785

DEW POINT RECORDER AND INDICATOR

Charles Warren Thornthwaite, Arlington, Va.; dedicated to the free use of the People in the territory of the United States Application June 13, 1941, Serial No. 397,864

1 Claim. (Cl. 73—51)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to an apparatus for determining the moisture concentration of a gas by the method of ascertaining its dew point temperature.

One of the objects of this invention is the provision of an apparatus which can be used to indicate the changes in the moisture concentration of a gas over periods of time.

This invention has many uses, such as in the field of weather forecasting. It can be used to determine evaporation from free water surfaces and evaporation and transpiration from land surfaces, which is of great importance in hydrology, agricultural climatology, ecology, and other studies. This invention also has commercial application in processes employing distilling or fractionating devices, such as in the manufacture of gasoline and alcohol. It is adaptable to the control of atmospheric humidity in air-conditioning work and may be used to prevent loss of perishable goods, such as foodstuffs and tobacco, during transportation by ship or railway.

This invention is further useful in determining the moisture concentration of gases flowing through pipes, such as municipally supplied illuminating gas.

The following description, considered together with the accompanying drawing, will disclose this invention more fully—its arrangement and operation of parts and further objects and advantages thereof will be apparent.

In the accompanying drawing there is illustrated a schematic diagram of an embodiment of my invention in which the numeral 5 designates a mirror or light reflecting surface, preferably of a heat-conducting metal, in contact with one end of a heat-conducting rod 6. The rod 6 is mounted through a heat-insulating stopper 7, such as cork, which stopper is removably disposed in the mouth 8 of an inverted container 9, preferably of a heat-insulating material or construction, such as a conventional thermos bottle. The container 9 is adapted to hold a cooling medium, such as water ice with salt, dry ice with or without alcohol, ether, and the like, or any other suitable cooling medium. The other end of the rod 6 extends within the container 9 and is provided with a knob or plate 10 in contact with the cooling medium. In this manner the rod 6 acts to transfer heat from its outer end to the source of cold within the container 9.

Near the mirror 5 there is provided about the rod 6 an electrical heating element 11. The outer end of the stopper 7, together with the mirror 5, is enclosed in a light-proof, air-tight housing 12, substantially as shown. A source of light 13 is provided, light from which is directed on the mirror 5 through a tube 14 mounted through a wall 15 of the housing 12. When the mirror 5 is dry, the light from the source 13 is reflected specularly out of the housing 12 through a tube 16 mounted through another wall 17 of the said housing opposite the wall 15. Within the housing 12, at a point which is out of direct contact with light emanating from the source 13 or of light reflected specularly from the mirror 5, there is disposed a photo-electric tube 18, or some other suitable light-sensitive device of the non-self-generating type, which is connected in series with the grid circuit of an amplification tube 19, said amplification tube comprising the usual filament 20, plate 21, grid 22, and cathode 23. A battery 24 is the source of potential for the photo-electric tube so that when light is incident on the photo-electric tube a current will flow in the circuit comprising the photo-electric tube 18, the battery 24, and a resistor 25 which is in the grid circuit of the amplification tube 19. The plate circuit of said tube is connected in series with the heating element 11 and a "B" battery 26. The potential for the filament 20 of the amplification tube is supplied by an "A" battery 27. A "C" battery 28 is used in the usual manner to increase the negative potential on the grid 22 and to decrease the plate current so that, when the grid circuit is not connected to the photo-electric tube 18, no current flows through the plate circuit.

A thermocouple 29 is attached to the mirror 5 and is electrically connected to a suitable temperature-recording mechanism 30 of any type desired.

In operation the cooling medium is placed in the container 9 in contact with the knob or plate 10 to which heat flows from the mirror 5. Light from the source 13 is reflected specularly from the mirror 5 and out through tube 16. The flow of heat from the mirror 5 continues until moisture from the atmosphere within the housing 12 condenses on the mirror 5. The condensate causes the light reaching the mirror 5 to scatter or diffuse within the housing 12. Consequently, the photo-electric tube 18 receives a greater amount of light under this condition than it does when the light from the source 13 is reflected specularly out through the tube 16. This increase in the amount of light which reaches the tube 18 consequently increases the current in the circuit comprising the tube 18, the battery 24 and resistor 25, causing the grid 22 to become more positive with respect to the cathode 23 and, hence, increasing the current flowing in the plate circuit of the amplification tube 19. This causes an amplified current, sufficient to operate the heating element 11, to flow through the plate circuit. The heat from said heating element is dissipated along the rod 6, some of which flows to the mirror 5 and evaporates the condensate thereon. As this evaporation progresses, the amount of light from the source 13 reaching the photo-electric tube decreases correspondingly, which, in turn, causes a decrease in the amount of heat from the heating element 11. This proceeds to substantially a point of equilibrium where the amount of heat from the heating element 11 balances the cold so that the temperature of the mirror 5 is maintained substantially at the dew point of the gas, a partial condensation at least remaining on the mirror thereafter. As the moisture concentration in the atmosphere surrounding the mirror 5 changes, the temperature of condensation will vary, causing the equilibrium point to shift and causing the temperature of the mirror 5 to vary accordingly. By means of the thermocouple 29 and the recorder mechanism 30, changes over a period of time of the moisture concentration in the atmosphere surrounding the mirror 5 may be recorded.

In using this device, the gas, the conditions of which are to be determined, is circulated through the housing 12 by means of a fan 31, which draws the gas in through the tube 16 and discharges it through an aperture 32 in the wall 15. Any other suitable location of the aperture 32 may be provided, the general arrangement preferred being such that the gas entering through the tube 16 comes in contact with the mirror 5 as quicky as possible.

Having thus described my invention, I claim:

A device for determining the changes in moisture conditions of a gas comprising a source of cold, a heat-conductible rod having one end in contact with said source, a plate having a light-reflecting surface normally contacting the other end of the rod, means for measuring the temperature of said plate, a source of light, a light-sensitive element, said reflecting surface reflecting light from said source away from said light-sensitive element while dry, said light-sensitive means being disposed so as to receive light reflected from said reflecting surface when moisture has precipitated thereon, an electrical heating element near said plate, an amplification tube controlled by said light-sensitive element and means controlled by said amplification tube for actuating said heating element only when light is incident on said light-sensitive element.

CHARLES WARREN THORNTHWAITE.